(12) United States Patent
Maxwell et al.

(10) Patent No.: US 8,667,663 B2
(45) Date of Patent: Mar. 11, 2014

(54) ECCENTRIC FITTING ASSEMBLY

(75) Inventors: Robert W. Maxwell, Fairfield, CT (US);
Scott A. Chasen, Orange, CT (US);
Barton J. Hainsworth, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 232 days.

(21) Appl. No.: 13/132,922

(22) PCT Filed: Oct. 26, 2009

(86) PCT No.: PCT/US2009/062027
§ 371 (c)(1),
(2), (4) Date: Jun. 5, 2011

(87) PCT Pub. No.: WO2010/065213
PCT Pub. Date: Jun. 10, 2010

(65) Prior Publication Data
US 2011/0239439 A1  Oct. 6, 2011

Related U.S. Application Data

(63) Continuation-in-part of application No. PCT/US2008/085626, filed on Dec. 5, 2008.

(51) Int. Cl.
*F16B 21/12* (2006.01)

(52) U.S. Cl.
USPC ......... 29/525.02; 403/299; 403/328; 403/345

(58) Field of Classification Search
USPC ........... 16/2.1; 29/525.02; 403/299, 328, 345, 403/376; 411/76, 398; 418/55.1, 55.3
See application file for complete search history.

(56) References Cited

U.S. PATENT DOCUMENTS

| 687,183 | A | | 11/1901 | Kolander | |
|---|---|---|---|---|---|
| 1,180,157 | A | | 4/1916 | Lacey | |
| 2,448,817 | A | | 9/1948 | McArthur | |
| 2,614,781 | A | | 10/1952 | Engel | |
| 2,676,045 | A | | 4/1954 | Moskovitz | |
| 3,385,624 | A | * | 5/1968 | Baclini | 292/341.18 |
| 4,501,404 | A | | 2/1985 | Nelson | |
| 4,525,010 | A | | 6/1985 | Trickey | |
| 4,749,898 | A | * | 6/1988 | Suzuki et al. | 310/114 |

(Continued)

FOREIGN PATENT DOCUMENTS

| JP | 2066308 | 3/1990 |
|---|---|---|
| JP | 2005324612 | 11/2005 |

(Continued)

OTHER PUBLICATIONS

David Aircraft Products Co., Inc., Chair Stud Fitting, Aug. 18, 2008.

(Continued)

*Primary Examiner* — Alexander P Taousakis
(74) *Attorney, Agent, or Firm* — Carlson, Gaskey & Olds P.C.

(57) ABSTRACT

An eccentric fitting assembly includes an outer eccentric fitting which defines an outer axis, the outer eccentric fitting defines an opening offset from the outer axis and an inner eccentric fitting which defines an inner axis, the inner eccentric fitting defines a stud opening offset from the inner axis, the inner eccentric fitting receivable within the opening.

17 Claims, 8 Drawing Sheets

(56) References Cited

U.S. PATENT DOCUMENTS

| | | | |
|---|---|---|---|
| 4,856,738 A | 8/1989 | Martin | |
| 5,024,138 A | 6/1991 | Sanderson | |
| 5,044,578 A | 9/1991 | White et al. | |
| 5,141,537 A * | 8/1992 | Te | 96/136 |
| 5,187,318 A | 2/1993 | Sanderson | |
| 5,259,575 A | 11/1993 | Cabrera | |
| 5,419,234 A | 5/1995 | Sanderson | |
| 5,421,239 A | 6/1995 | Sanderson | |
| 5,499,783 A | 3/1996 | Marechal | |
| 5,517,895 A | 5/1996 | Sanderson | |
| 5,520,357 A | 5/1996 | Payne | |
| 5,562,264 A | 10/1996 | Bietenhader | |
| 5,730,492 A | 3/1998 | Warrick et al. | |
| 5,842,669 A | 12/1998 | Ruff | |
| 5,901,519 A | 5/1999 | Wilson | |
| 6,050,034 A * | 4/2000 | Krinner | 52/155 |
| 6,176,167 B1 | 1/2001 | Sanderson | |
| 6,176,169 B1 | 1/2001 | Rostocil | |
| 6,241,185 B1 | 6/2001 | Sanderson | |
| 6,250,196 B1 | 6/2001 | Sanderson | |
| 6,263,776 B1 | 7/2001 | Rostocil | |
| 6,286,806 B1 | 9/2001 | Corcoran | |
| 6,293,016 B1 | 9/2001 | Sanderson | |
| 6,293,179 B1 | 9/2001 | Sanderson | |
| 6,401,592 B1 | 6/2002 | Rostocil | |
| 6,427,945 B1 | 8/2002 | Bansemir | |
| 6,644,590 B2 | 11/2003 | Terpay et al. | |
| 6,712,414 B2 | 3/2004 | Morrow | |
| 6,766,623 B1 | 7/2004 | Kalnay | |
| 6,848,853 B2 * | 2/2005 | Yamada | 403/4 |
| 7,152,614 B2 | 12/2006 | Kalnay | |
| 7,344,758 B2 | 3/2008 | Franchina et al. | |
| 7,393,167 B2 | 7/2008 | Dowty | |
| 2005/0129554 A1 | 6/2005 | Lee et al. | |
| 2008/0149764 A1 | 6/2008 | Frey | |
| 2011/0239439 A1 * | 10/2011 | Maxwell et al. | 29/525.02 |

FOREIGN PATENT DOCUMENTS

| | | |
|---|---|---|
| KR | 10-1993-0703547 | 11/1993 |
| KR | 10-2001-0080561 | 8/2001 |
| KR | 10-0830127 | 5/2008 |

OTHER PUBLICATIONS

International Search Report and Written Opinion, PCT/US2008/085626, dated Sep. 3, 2009.

International Search Report and Written Opinion, PCT/US2009/062027, dated Jun. 1, 2010.

* cited by examiner

ECCENTRIC FITTING ASSEMBLY

The present disclosure is a Continuation-In-Part application which claims priority to PCT International Application No. PCT/US08/85626, filed 5 Dec. 2008.

This invention was made with government support under U.S. Army Contract No. W58RGZ-08-C-0003. The government therefore has certain rights in this invention.

BACKGROUND

The present disclosure relates to a fitting assembly, and more particularly to a fitting assembly which facilitates installation of equipment through accommodation of airframe build and supplier component structure tolerances.

A variety of equipment may be mounted within an aircraft cabin. Aircrew seats, litters and weapon racks, for example, may be mounted to the cabin floor with a fitting which permits the installation and removal of the equipment to reconfigure the aircraft as required.

Some equipment which is interchangeably mounted within the aircraft cabin may require a structurally tight installation which does not generate a mount preload. Such equipment may not readily accommodate airframe build and equipment tolerances. Assembly may thereby necessitate the mix-and-match of specific equipment to specific aircraft to complete each installation.

SUMMARY

An eccentric fitting assembly according to an exemplary aspect of the present disclosure includes an outer eccentric fitting which defines an outer axis, the outer eccentric fitting defines an opening offset from the outer axis. An inner eccentric fitting defines an inner axis, the inner eccentric fitting defines a stud receiver opening offset from the inner axis, the inner eccentric fitting receivable within the opening.

A method of mounting equipment to a stud according to an exemplary aspect of the present disclosure includes attaching an outer eccentric fitting to the equipment, the outer eccentric fitting defines an outer axis, the outer eccentric fitting defines an opening offset from the outer axis. Attaching an inner eccentric fitting such that a stud opening surrounds the stud, the inner eccentric fitting defines an inner axis, the stud opening offset from the inner axis. Receiving the inner eccentric fitting within the opening such that the inner eccentric fitting engages the stud and the inner eccentric fitting rotates within the opening to compensate for an offset between the equipment and the stud.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
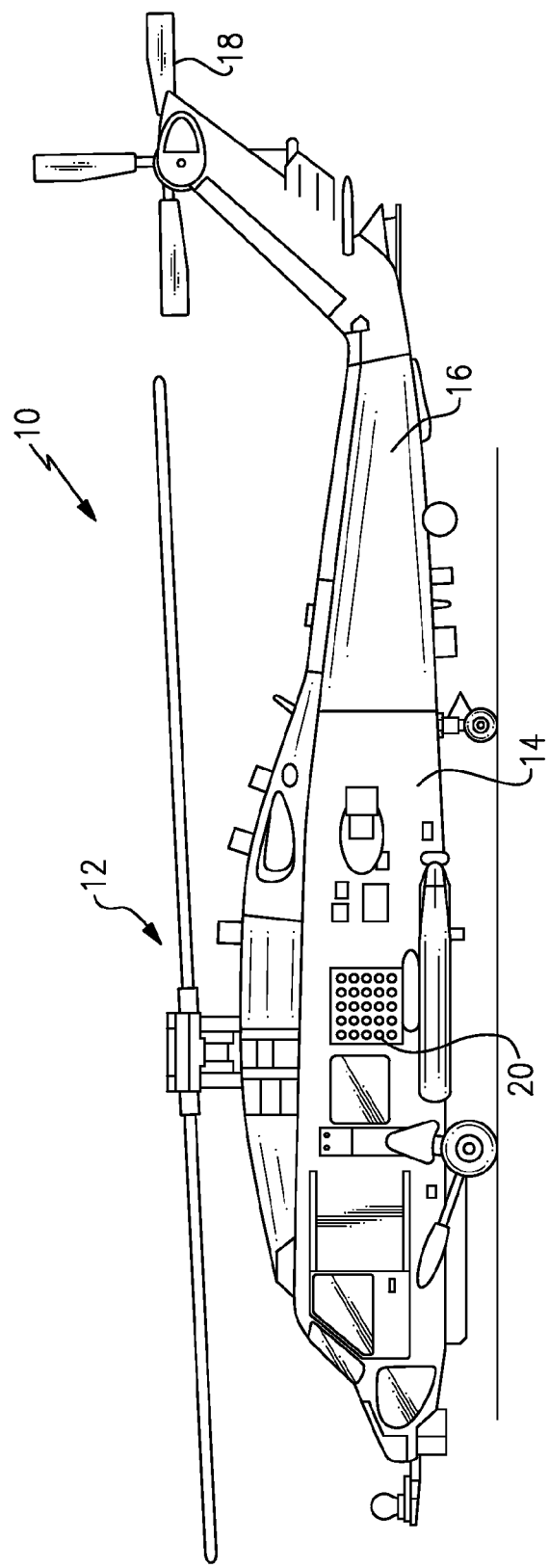
FIG. 1 is a schematic view of a rotary-wing aircraft embodiment for use with the present disclosure.

FIG. 1 schematically illustrates a rotary-wing aircraft 10 having a main rotor system 12. The aircraft 10 includes an airframe 14 having an extending tail 16 which mounts an anti-torque system 18. Although a particular helicopter configuration is described in the disclosed embodiment, other configurations and/or machines, such as high speed compound rotary-wing aircraft with supplemental translational thrust systems, dual contra-rotating, coaxial rotor system aircraft, turbo-props, tilt-rotors, tilt-wing and straight wing aircraft, will also benefit herefrom. The aircraft 10 may carry munitions 20 such as sonobuoys.

Figure 2:
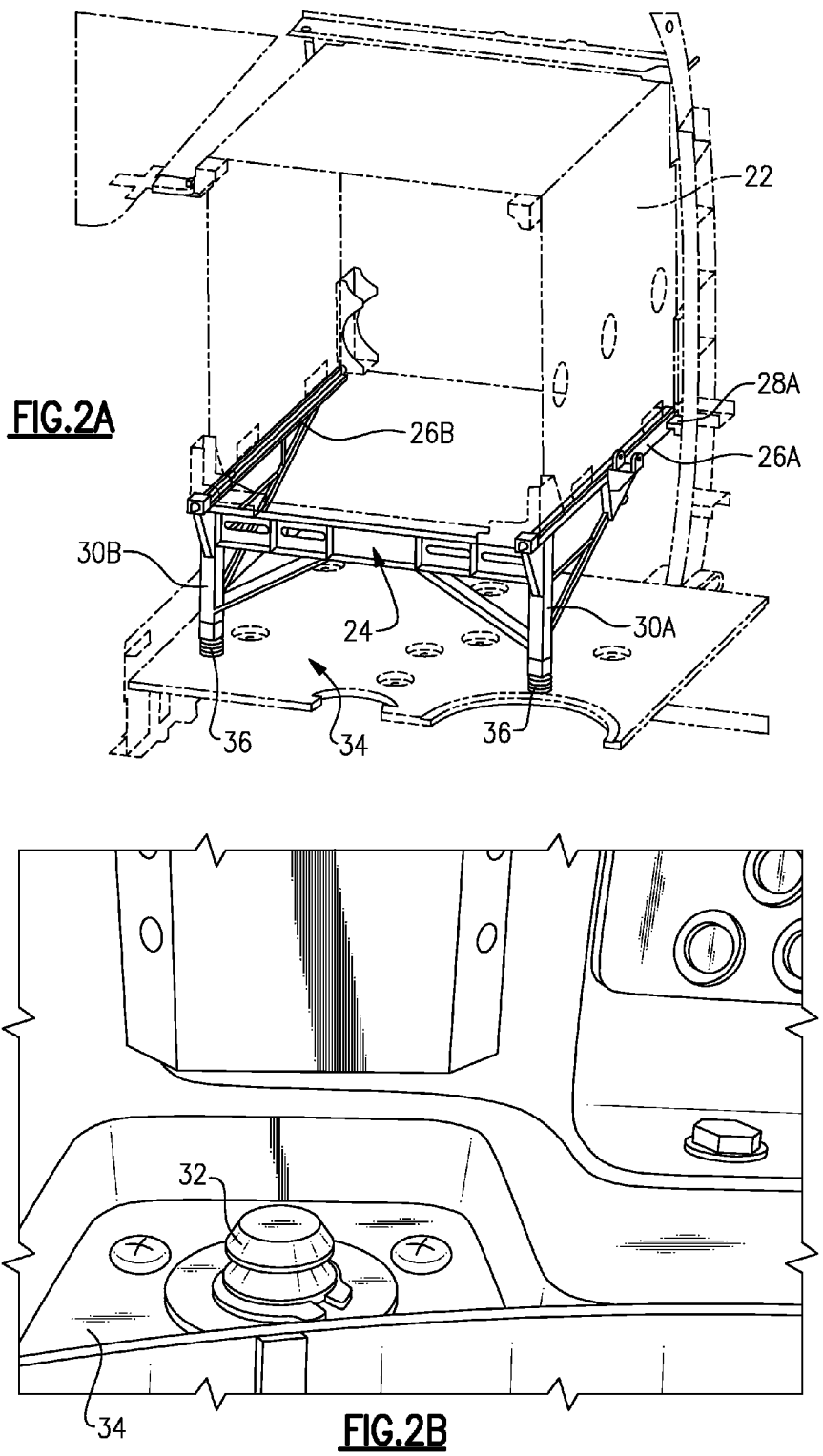
FIG. 2A is a perspective view within a cabin of a rotary-wing aircraft with a munition launcher supported upon a stand removably mounted to a cabin floor.
FIG. 2B is a perspective view of a stud within the cabin floor.

Referring to FIG. 2A, the munitons 20 may be contained within a launcher 22 supported upon a stand 24. The stand 24 may be removably mounted within the aircraft cabin. The stand 24 includes two pivot arms 26A, 26B which interface with two lower window mount fittings 28A, 28B and two stand support legs 30A, 30B. Each of the stand interfaces are close tolerance fits for structural considerations and may not allow for normal tolerance variations in the airframe and stand even with the telescopic adjustment in the height of the stand support legs 30A, 30B.

An eccentric fitting assembly 36 mountable to each of the legs 30A, 30B facilitate interface with a respective floor stud 32 in the cabin floor 34 (FIG. 2B). The eccentric fitting assembly 36 may be threaded into the legs 30A, 30B without interference with the telescopic adjustment. The eccentric fitting assembly 36 readily retrofits with other standard threaded/stud mount arrangements. It should be understood that although a sonobuoy stand is illustrated in the disclosed non-limiting embodiment, other equipment such as racks, crew seats and litters employed in military or commercial aircraft will also benefit from usage of the eccentric fitting assembly 36 disclosed herein.

Figure 3:
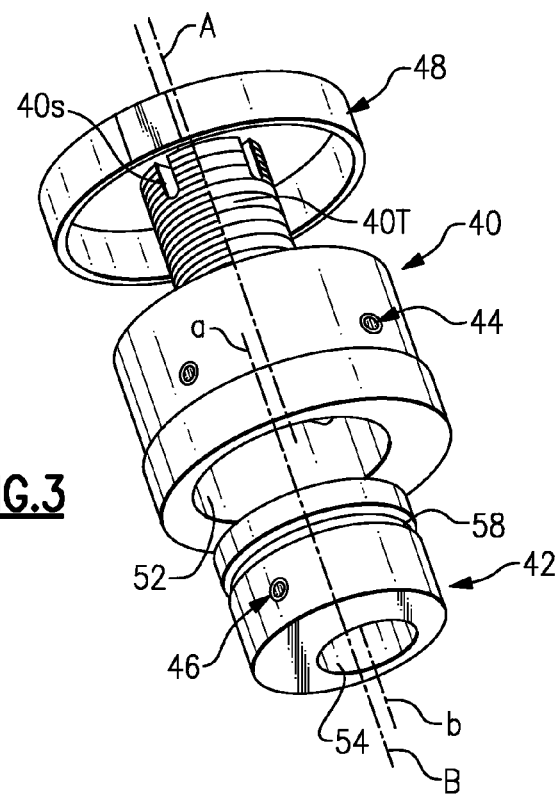
FIG. 3 is an exploded view of the eccentric fitting assembly.

Referring to FIG. 3, the eccentric fitting assembly 36 generally includes an outer eccentric fitting 40, an inner eccentric fitting 42, an outer spring pin system 44, an inner spring pin system 46 and a lock ring 48. Relative rotation of the outer eccentric fitting 40 and the inner eccentric fitting 42 results in adjustment of the centerline of the eccentric fitting assembly 36. The outer eccentric fitting 40 is generally cylindrical in the illustrated non-limiting embodiment, but may alternatively be of a polygonal configuration to facilitate installation and adjustment by hand or with a tool.

A threaded section 40T of the outer eccentric fitting 40 facilitates installation of the eccentric fitting assembly 36 to the respective stand support legs 30A, 30B or other equipment to provide vertical adjustment thereof. It should be understood that attachments other than the threaded section 40T may alternatively or additionally be provided. The threaded section 40T may additionally include slots 40S which, when aligned to aperture in the stand support legs 30A, 30B facilitates lock-wire attachment to prevent rotation out of adjustment.

The outer eccentric fitting 40 includes an opening 52 which is sized to receive the inner eccentric fitting 42. The opening 52 is defined along an axis A which is offset from a longitudinal axis A defined by the threaded section 40T of the outer eccentric fitting 40. The inner eccentric fitting 42 includes a stud opening 54 which is defined along an axis B which is also offset from a longitudinal axis B defined by the inner eccentric fitting 42.

The offset of opening 52 and stud opening 54 is equivalent such that relative rotation of the outer eccentric fitting 40 and the inner eccentric fitting 42 positions the centerline b of the stud opening 54 from along axis A, which is the true center of the eccentric fitting assembly 36 as defined by the threaded section 40T (FIG. 4A), to a maximum radial offset when the outer eccentric fitting 40 and the inner eccentric fitting 42 define a relative rotational position of 180 degrees (FIG. 4B) such that the centerline b of the stud opening 54 is offset from axis A. Through the relative rotation of the outer eccentric fitting 40 and the inner eccentric fitting 42, an axis b of the stud opening 54 may be located anywhere within a diameter defined by the relative rotation.

Figure 4A:
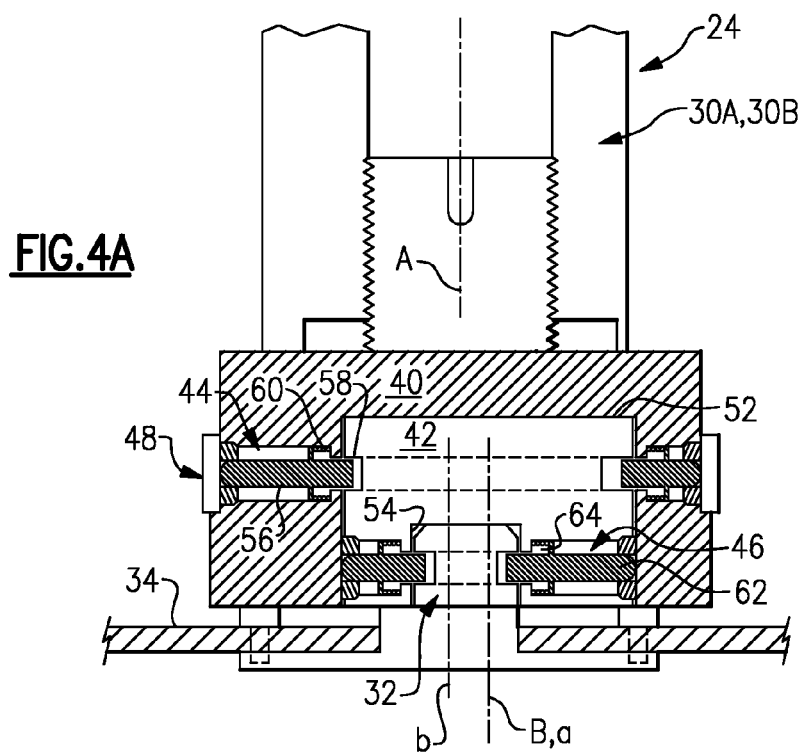
FIG. 4A is a schematic section view of the eccentric fitting assembly in a first position.
Figure 4B:
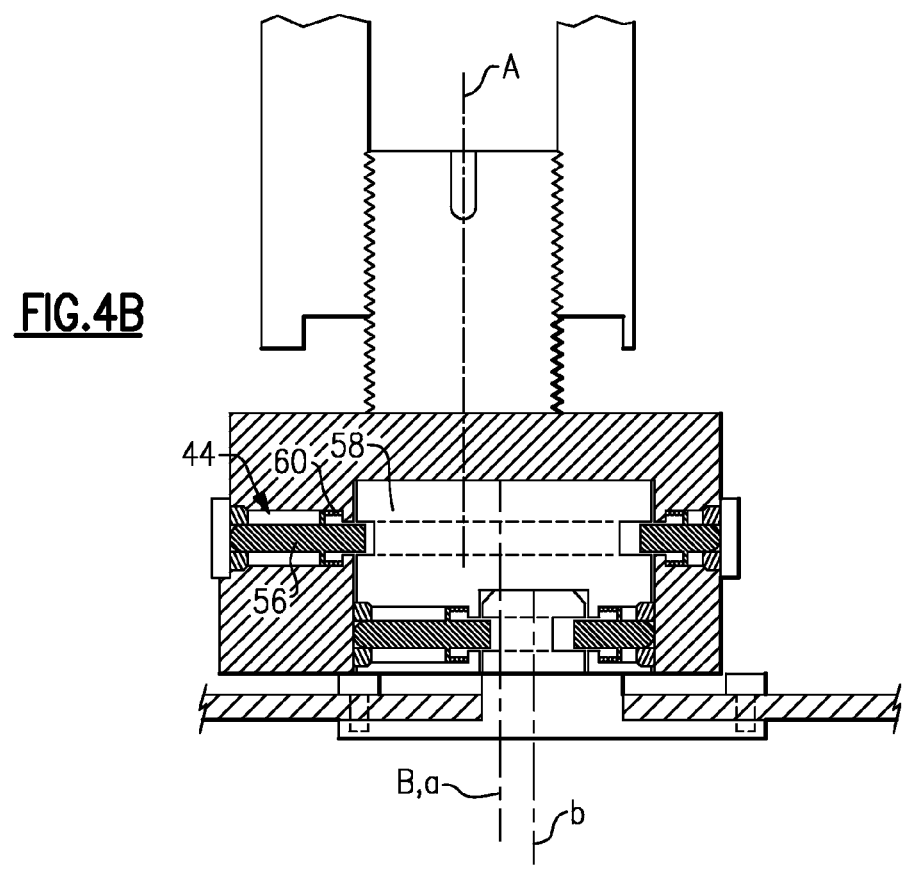
FIG. 4B is a schematic line view of the eccentric fitting assembly in a second position.
Figure 5:
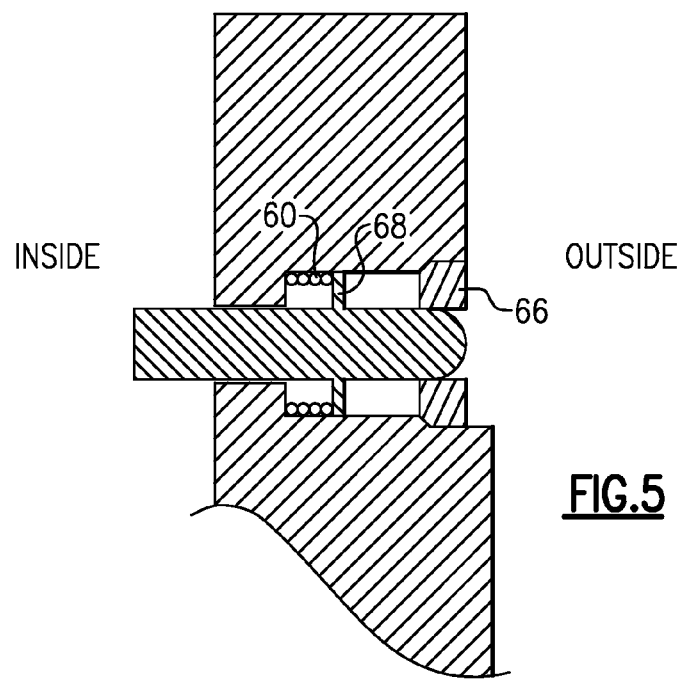
FIG. 5 is a schematic sectional line view of a spring pin system of the eccentric fitting assembly.

Referring to FIG. 4A, the outer spring pin system 44 is located within the outer eccentric fitting 40 transverse to axis A such that a multiple of lock pins 56 are receivable within a slot 58 defined about the outer perimeter of the inner eccentric fitting 42. Each of the lock pins 56 are biased outward relative axis A by a spring 60 and retained within the outer eccentric fitting 40 by a retainer 66 (FIG. 5). The spring 60 reacts against a flange 68 formed by the lock pin 56. Alternatively, the flange 68 may be formed by a clip ring or the like attached to the lock pin 56.

The inner spring pin system 46 is located within the stud opening 54 transverse to axis B such that a multiple of stud lock pins 62 are engageable with the floor stud 32. Each of the stud lock pins 62 are biased outward relative axis B by a spring 64 and are mounted within the inner eccentric fitting 42 as discussed with regard to the outer spring pin system 44.

The eccentric fitting assembly 36 facilitates installation of the stand 24 or other equipment onto the cabin floor 34 or other surface with studs 32. The threaded section 40T of the outer eccentric fitting 40 is threaded into the respective stand support legs 30A, 30B or other equipment. The inner eccentric fitting 42 is located over the floor stud 32. The outer eccentric fitting 40 is then located over the inner eccentric fitting 42 such that the inner eccentric fitting 42 is received within the opening 52. Insertion of the inner eccentric fitting 42 within the opening 52 drives the stud lock pins 62 into the stud opening 54 to lock the multiple of stud lock pins 62 onto the floor stud 32. The lock ring 48 is then mounted onto the outer eccentric fitting 40 to drive the multiple of lock pins 56 into the slot 58 to lock the inner eccentric fitting 42 within the outer eccentric fitting 40 to thereby lock the eccentric fitting assembly 36 together and attach the stand 24 to the cabin floor 34. The lock ring 48 may be engaged with the outer eccentric fitting 40 through a threaded or sliding engagement.

Figure 6A:
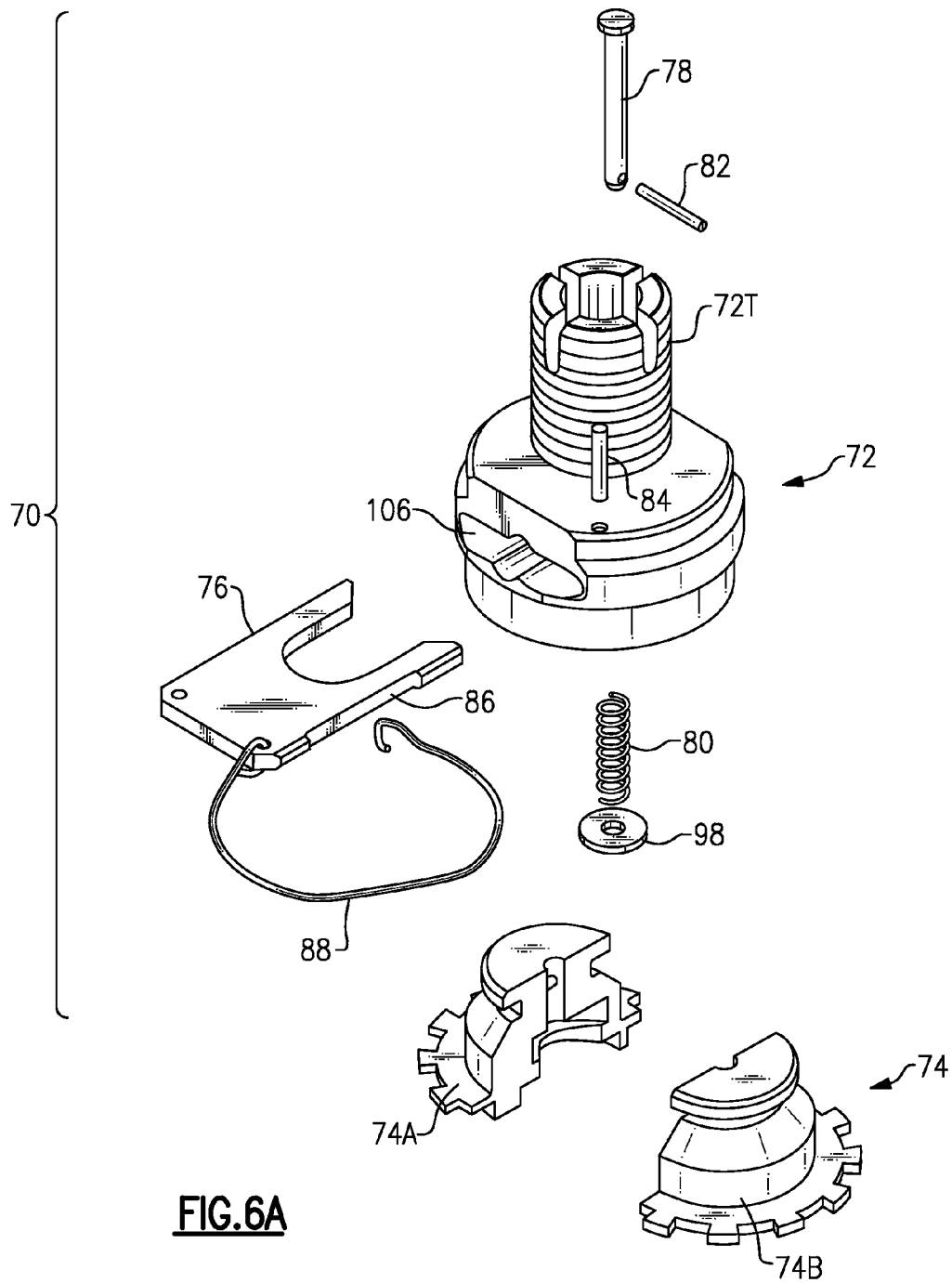
FIG. 6A is an exploded view of another non-limiting embodiment of an eccentric fitting assembly.

Referring to FIG. 6A, another embodiment of an eccentric fitting assembly 70 generally includes an outer eccentric fitting 72, an inner eccentric fitting 74, and a lock fork plate 76. Relative rotation of the outer eccentric fitting 72 and the inner eccentric fitting 74 results in adjustment generally as discussed above.

A threaded section 72T of the outer eccentric fitting 72 facilitates installation of the eccentric fitting assembly 36 to the respective stand support legs 30A, 30B or other equipment to provide vertical adjustment thereof. The threaded section 72T defines an axis A about which the outer eccentric fitting 72 is rotated to provide vertical adjustment between the eccentric fitting assembly 36 and the respective stand support legs 30A, 30B (FIG. 2A)

Figure 6B:
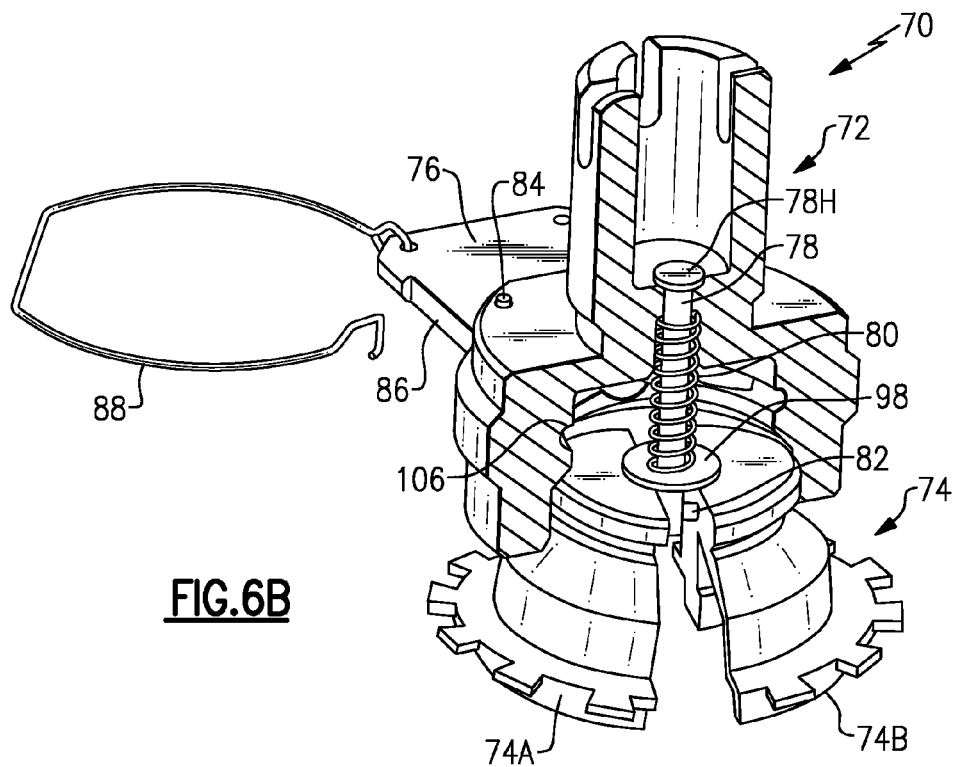
FIG. 6B is a perspective partial sectional view of the eccentric fitting assembly of FIG. 6A in an unlocked condition.
Figure 6C:
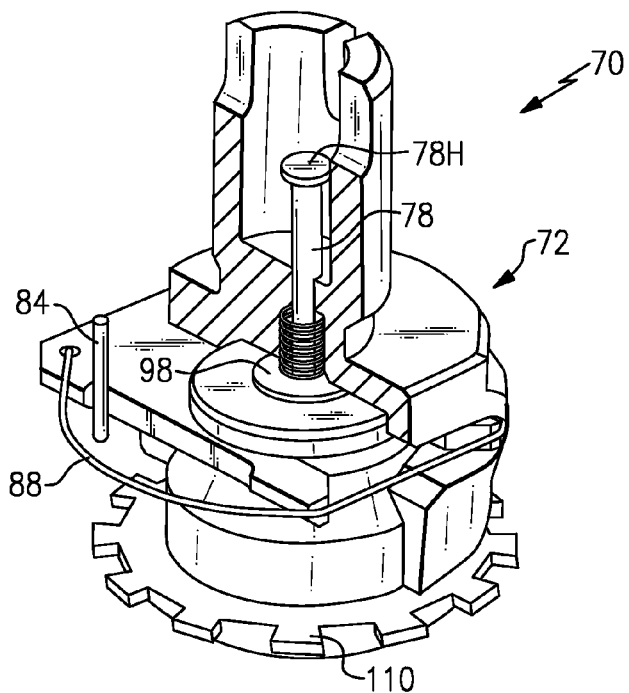
FIG. 6C is a perspective partial sectional view of the eccentric fitting assembly of FIG. 6A in a locked condition.

The eccentric fitting assembly 70 further includes a rod 78 which is biased by a spring 80. The rod 78 is retained to a first inner eccentric fitting portion 74A and a second inner eccentric fitting portion 74B with a roll pin 82 (FIG. 6B). A roll pin 84 interfaces with a slot 86 within the lock fork plate 76 to limit travel of the lock fork plate 76 and prevent detachment thereof from the eccentric fitting assembly 70 (FIG. 6B). A spring wire retainer 88 is attached to the lock fork plate 76 to retain the lock fork plate to the eccentric fitting assembly 70 in a locked position (FIG. 6C).

The outer eccentric fitting 72 mounts the roll pin 84 to interface with the slot 86. The roll pin 84 interfaces with the slot 86 within the lock fork plate 76 to constrain sliding movement of the lock fork plate 76 as an assembly to the outer eccentric fitting 72 but permits sliding movement to provide engagement or release of the first inner eccentric fitting portion 74A and the second inner eccentric fitting portion 74B.

The first inner eccentric fitting portion 74A and the second inner eccentric fitting portion 74B may include an interface 110 such as a multiple tooth outer perimeter which extend below and outside the outer eccentric fitting 72 to provide a wheel for an installer to rotate the inner eccentric fitting 74 relative to the outer eccentric fitting 72. This facilitates alignment and installation of the eccentric fitting assembly 70 to the floor stud 32.

Figure 6D:
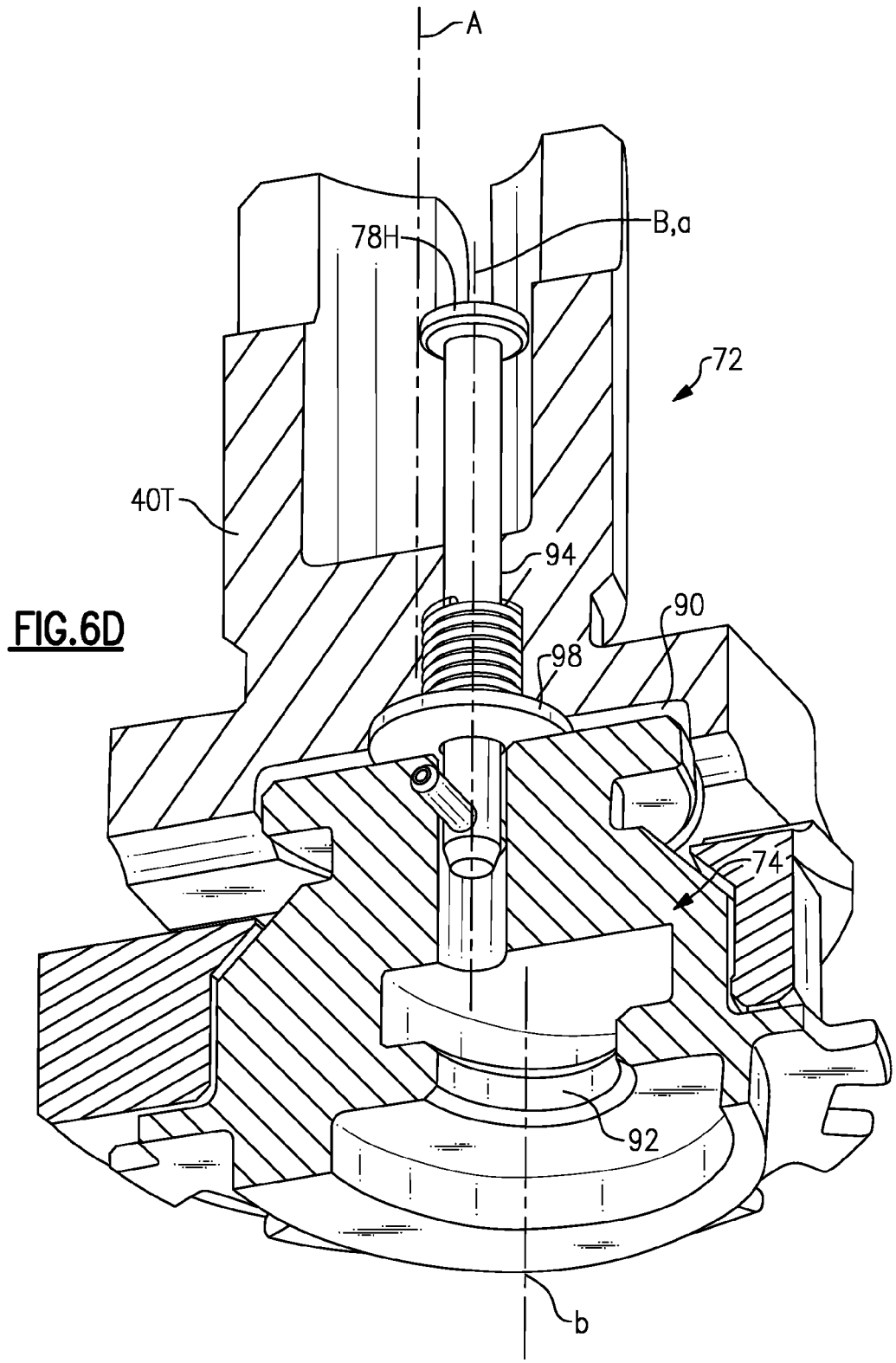
FIG. 6D is a sectional view of the eccentric fitting assembly of FIG. 6A.

Referring to FIG. 6D, the outer eccentric fitting 72 is defined along an axis A defined by the threaded section 40T. The outer eccentric fitting 72 includes an opening 90 defined along an axis A. Opening 90 is sized to receive the inner eccentric fitting 74 along an axis of rotation B. The opening 90 is offset from the longitudinal axis A defined by the threaded section 40T of the outer eccentric fitting 72.

The inner eccentric fitting 74 includes a stud opening 92 defined along an axis B which is also offset within the inner eccentric fitting 74 and relative to the axis of rotation B. The offset of opening 90 and stud opening 92 may be equivalent such that relative rotation of the outer eccentric fitting 72 and the inner eccentric fitting 74 may position the stud opening 92 from along axis A, which is the true center of the eccentric fitting assembly 36 with regard to the threaded section 72T, to a maximum radial offset when the outer eccentric fitting 72 and the inner eccentric fitting 74 define a relative rotational position of 180 degrees. Through the relative rotation of the outer eccentric fitting 72 and the inner eccentric fitting 74, the stud opening 92 may be located anywhere within a diameter defined by the relative rotation.

A rod opening 94 is defined along the axis of rotation B to receive rod 78. The roll pin 82 is transverse to the axis B for receipt within clearance apertures 96 in each of the first inner eccentric fitting portion 74A and the second inner eccentric fitting portion 74B. A head 78H of the rod 78 limits maximum extension of the rod 78 in response to the bias of the spring 80 (FIG. 6B).

A washer 98 further supports the first inner eccentric fitting portion 74A and the second inner eccentric fitting portion 74B when in an unlocked position (FIG. 6B) and facilitates relative rotation between the outer eccentric fitting 72 and the inner eccentric fitting 74 when in a locked position (FIG. 6C). Maximum extension of the rod 78 assures that the first inner eccentric fitting portion 74A and the second inner eccentric fitting portion 74B may separate to receive the floor stud 32 but not disengage from the outer eccentric fitting 72 to assure a single assembly.

Figure 6E:
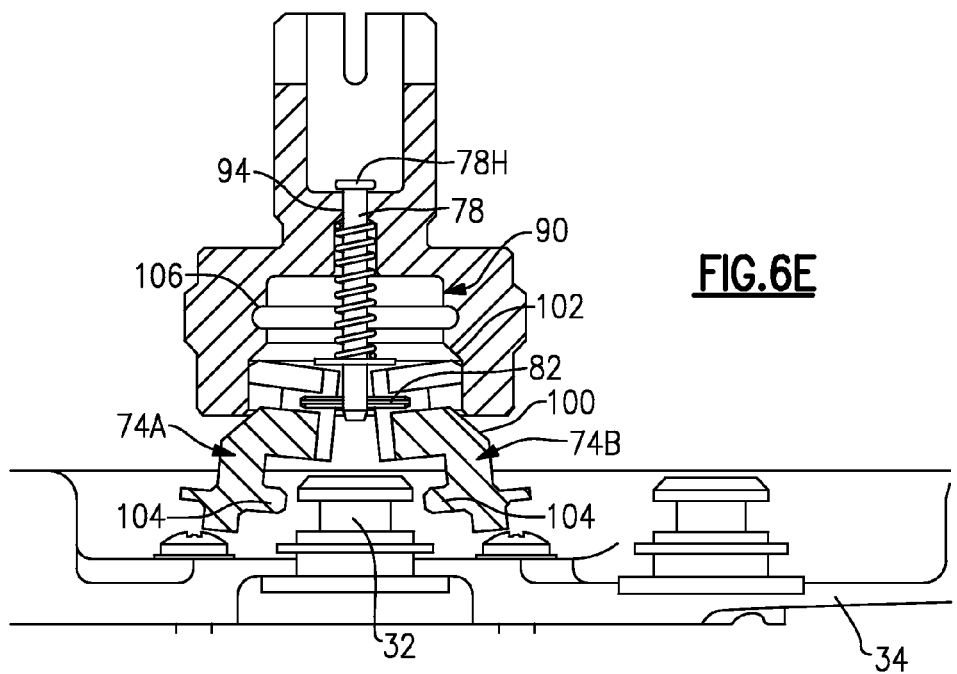
FIG. 6E is a sectional view of the eccentric fitting assembly of FIG. 6A in an unlocked condition.
Figure 6F:
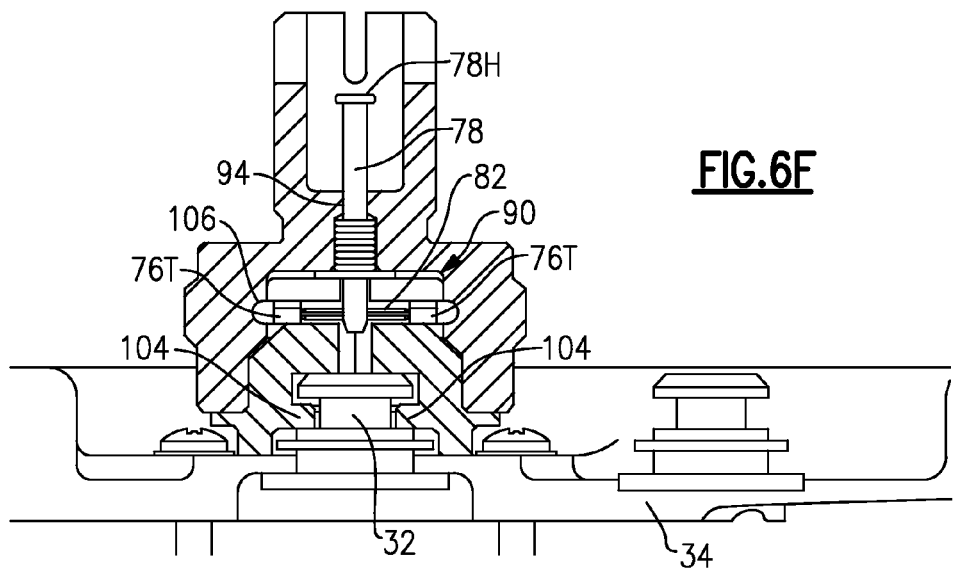
FIG. 6F is a sectional view of the eccentric fitting assembly of FIG. 6A in a locked condition.

Referring to FIG. 6E, the first inner eccentric fitting portion 74A and the second inner eccentric fitting portion 74B include a frustro-conical shape 100 along an outside surface thereof with a corresponding frustro-conical surface 102 within the opening 90 to facilitate closure of the first inner eccentric fitting portion 74A and the second inner eccentric fitting portion 74B when the outer eccentric fitting 72 is translated downward toward the floor stud 32 (FIG. 6F).

The first inner eccentric fitting portion 74A and the second inner eccentric fitting portion 74B thereby close around the floor stud 32 to capture the floor stud within tangs 104 defined within the stud opening 92 (FIG. 6F).

As the first inner eccentric fitting portion 74A and the second inner eccentric fitting portion 74B are retracted within the opening 90, the rod 78 retracts through the rod opening 94 and thereby compresses the spring 80. When the first inner eccentric fitting portion 74A and the second inner eccentric fitting portion 74B are fully retracted within the opening 90, the floor stud 32 is captured therein.

A slot 106 is defined through the outer eccentric fitting 72 approximately mid-way along, and transverse to axis B, to receive the lock fork plate 76. The first inner eccentric fitting portion 74A and the second inner eccentric fitting portion 74B define a mating groove 108A, 108B within an outer periphery thereof to receive the tines 76T of the lock plate fork 76 when fully inserted into the slot 106. The lock plate fork 76 thereby locks the first inner eccentric fitting portion 74A and the second inner eccentric fitting portion 74B within the opening 90 to react the bias of spring 80 and thus lock the eccentric fitting assembly 70 to the floor stud 32. The lock plate fork 76 reacts vertical loads imposed on the eccentric fitting assembly 70 and prevents separation of the eccentric fitting assembly 70 from the cabin floor 34.

Once the lock fork plate 76 is fully positioned within the slot 106, the spring wire retainer 88 attached to the lock fork plate 76 may be engaged with the outer eccentric fitting 72 to secure the lock fork plate 76 in the locked position (FIG. 6C). The spring wire retainer 88 assures prevention of an unintended disengagement due to vibration.

The eccentric fitting assembly facilitates installation of equipment through accommodation of airframe build and supplier component structure tolerances yet reacts any upward or downward loads. Preservation of standard threaded stand and floor stud interfaces allow the eccentric fitting assembly 36 to be is directly retrofitable to legacy aircraft.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. An eccentric fitting assembly comprising:
   an outer eccentric fitting which defines an outer axis, said outer eccentric fitting defines an opening offset from said outer axis; and
   an inner eccentric fitting which defines an inner axis, said inner eccentric fitting defines a stud opening offset from said inner axis, said inner eccentric fitting receivable within said opening, wherein said outer eccentric fitting defines a threaded section which defines said outer axis.

2. The assembly as recited in claim 1, further comprising an outer spring pin system within said outer eccentric fitting, said outer spring pin system includes a multiple of lock pins transverse to said outer axis such that said multiple of lock pins are receivable within a slot about an outer periphery of said inner eccentric fitting to retain said inner eccentric fitting within said opening, said multiple of lock pins are biased outward relative said opening.

3. The assembly as recited in claim 2, further comprising a lock ring engageable with said outer eccentric fitting which retains said multiple of lock pins within said slot.

4. The assembly as recited in claim 2, further comprising an inner spring pin system within said inner eccentric fitting, said inner spring pin system includes a multiple of stud pins transverse to said inner axis, said multiple of stud pins are biased outward relative said stud opening.

5. The assembly as recited in claim 4, wherein said multiple of stud pins are driven inward to extend at least partially into said stud opening in response to said inner eccentric fitting being received within said opening.

6. The assembly as recited in claim 1, wherein said inner eccentric fitting includes a first inner eccentric fitting portion and a second inner eccentric fitting portion.

7. The assembly as recited in claim 6, wherein said first inner eccentric fitting portion and said second inner eccentric fitting portion are spring biased outward relative said opening.

8. The assembly as recited in claim 6, further comprising a lock fork plate transverse to said outer axis, said lock fork plate operable to lock said first inner eccentric fitting portion to said second inner eccentric fitting portion within said opening.

9. The assembly as recited in claim 6, further comprising a rod that is spring biased for axial movement along said outer axis, a pin mounted transverse to said rod for receipt within clearance apertures in each of the said first inner eccentric fitting portion and said second inner eccentric fitting portion.

10. An eccentric fitting assembly comprising:
    an outer eccentric fitting which defines an outer axis, said outer eccentric fitting defines an opening offset from said outer axis;
    an inner eccentric fitting which defines an inner axis, said inner eccentric fitting defines a stud opening offset from said inner axis, said inner eccentric fitting receivable within said opening, wherein said outer eccentric fitting defines an attachment section which defines said outer axis; and an outer spring pin system within said outer eccentric fitting, said outer spring pin system includes a multiple of lock pins transverse to said outer axis such that said multiple of lock pins are receivable within a slot about an outer periphery of said inner eccentric fitting to retain said inner eccentric fitting within said opening, said multiple of lock pins are biased outward relative said opening.

11. The assembly as recited in claim 10, further comprising a lock ring engageable with said outer eccentric fitting which retains said multiple of lock pins within said slot.

12. The assembly as recited in claim 10, further comprising an inner spring pin system within said inner eccentric fitting, said inner spring pin system includes a multiple of stud pins transverse to said inner axis, said multiple of stud pins are biased outward relative said stud opening.

13. The assembly as recited in claim 12, wherein said multiple of stud pins are driven inward to extend at least partially into said stud opening in response to said inner eccentric fitting being received within said opening.

14. The assembly as recited in claim 10, wherein said inner eccentric fitting includes a first inner eccentric fitting portion and a second inner eccentric fitting portion.

15. The assembly as recited in claim 14, wherein said first inner eccentric fitting portion and said second inner eccentric fitting portion are spring biased outward relative said opening.

16. The assembly as recited in claim 14, further comprising a lock fork plate transverse to said outer axis, said lock fork plate operable to lock said first inner eccentric fitting portion to said second inner eccentric fitting portion within said opening.

17. The assembly as recited in claim 14, further comprising a rod that is spring biased for axial movement along said outer axis, a pin mounted transverse to said rod for receipt within clearance apertures in each of the said first inner eccentric fitting portion and said second inner eccentric fitting portion.

\* \* \* \* \*